(12) United States Patent
Williams

(10) Patent No.: US 6,848,702 B1
(45) Date of Patent: Feb. 1, 2005

(54) SNATCH BAR FOR RELEASE HANDLE ON JACK STANDS

(76) Inventor: Thomas Williams, 2310 Old Oxford Hwy., Durham, NC (US) 27704

( * ) Notice: Subject to any disclaimer, the term of this patent is extended or adjusted under 35 U.S.C. 154(b) by 66 days.

(21) Appl. No.: 10/601,027

(22) Filed: Jun. 20, 2003

Related U.S. Application Data

(60) Provisional application No. 60/390,080, filed on Jun. 20, 2002.

(51) Int. Cl.[7] ................................................ B60D 1/00
(52) U.S. Cl. ..................................................... 280/475
(58) Field of Search ................................. 280/475, 431, 280/427, 43, 46; 254/418, 419, 423, 425

(56) References Cited

U.S. PATENT DOCUMENTS

| | | | | |
|---|---|---|---|---|
| 2,205,436 A | * | 6/1940 | Richards ...................... | 254/420 |
| 2,784,985 A | * | 3/1957 | Schnell ........................ | 254/420 |
| 2,885,181 A | * | 5/1959 | McCully et al. ............. | 254/420 |
| 2,890,466 A | * | 6/1959 | Bly ............................. | 114/344 |
| 3,709,522 A | * | 1/1973 | Olson ......................... | 280/453 |
| 3,801,068 A | * | 4/1974 | Kopas ........................ | 254/419 |
| 3,841,663 A | * | 10/1974 | Proffit ....................... | 280/475 |
| 4,623,125 A | * | 11/1986 | Ebey .......................... | 254/420 |
| 4,681,334 A | * | 7/1987 | O'Brien, Jr. ............. | 280/414.1 |
| 4,978,104 A | * | 12/1990 | Gipson, Jr. ................ | 254/420 |
| 5,348,326 A | * | 9/1994 | Fullenkamp et al. .... | 280/43.17 |

* cited by examiner

*Primary Examiner*—Lesley D. Morris
*Assistant Examiner*—Paul Royal, Jr.
(74) *Attorney, Agent, or Firm*—Mills Law Firm PLLC

(57) ABSTRACT

An assist assembly for actuating the release handle of a pivoting landing leg and a heavy trailer and providing an assist in raising and lowering the landing leg between a horizontal transport position and a vertical ground support position. The assist assembly includes a pivoting handle having camming surfaces to raising the release handle to an unlatched position maintaining weight bearing engagement with the handle during movement between the positions.

5 Claims, 10 Drawing Sheets

SNATCH BAR FOR RELEASE HANDLE ON JACK STANDS

This application claims the benefit under 35 USC 121 of U.S. Provisional Application Number. 60/390,080 filed on Jun. 20, 2002 in the name of Thomas M. Williams, Jr. and entitled "Snatch Bar for Manipulating the Release Handle on Jack Stands".

FIELD OF THE INVENTION

The present invention relates to devices for supporting trailored loads and, in particular, a releasing device for easily and conveniently unlatching and maneuvering jack stands and steerable landing legs on heavy trailers.

BACKGROUND OF THE INVENTION

Heavy duty trailers, such as those used by the military, have folding jack stands in the form of steerable landing legs for supporting the tongue of the trailer when not connected to the transport vehicle. In one such typical application, the M-149 Water Buffalo, a release handle with lock pins depending downwardly therefrom engage openings in the trailer to lock the landing leg in a raised position for towing by the transport vehicle. When the trailer is to be disconnected from the transport vehicle, the release handle is pulled upwardly to disengage the lock pins from the openings, allowing the landing leg to pivot downwardly to a vertical lowered position. The springs biasing the release handle are very strong requiring considerable strength for maintaining retraction thereby rendering the operating hand of limited assistance in retarding downward pivoting of the landing leg.

Inasmuch as it is not desirable to allow the landing leg to pivot downwardly freely, which could result in serious injury to legs and feet of the operator, a lower handle is provided on the foot of the landing leg for assisting the raising and lowering using the other hand of the operator. Single handed control, however, requires considerable strength and dexterity, even for the physically fit military personnel. Accordingly, injuries persist attributable to the lack of control in operating the landing feet on heavy vehicles. To overcome such hazards, generally two personnel are assigned to the task.

The military has sought to provide equipment that can be operated by a broad cross section of personnel. Preferably, the tasks could be performed by personnel in the $5^{th}$ to $95^{th}$ percentile. Current jack stands and landing legs designs cannot be operated this personnel range.

BRIEF SUMMARY OF THE INVENTION

The present invention provides an accessory that can be added, without modification, as an accessory to original or existing equipment on a wide range of heavy duty military trailers such as water carriers and ammunition carriers. The accessor increases operator control and operator safety during the raising and lowering of pivoting landing legs. The accessory includes a supplemental pivoting snatch bar that includes camming surfaces which engage release handle to unlock the landing leg and in combination with the exiting lift handle are used to distribute the forces required for the controlled pivoting of the landing leg between positions.

The invention is further characterized by a trailer having a landing leg pivotally supported and a trailer tongue and moveable between a horizontal raised position and a vertical lowered position wherein said trailer includes a shiftable release handle moveable between latched condition preventing movement of the landing leg from one of said positions and an unlatched condition permitting movement of the landing leg between positions, an assist device being provided for shifting the release handle comprising: a lever member pivotally supported on said trailer adjacent said release handle and moveable between a rest position and an actuating position, said lever member including camming surfaces engaging said release handle and effecting movement to said unlatched condition and stop surfaces maintaining a weight bearing engagement with said release handle for assisting pivoting said landing lead between said raised position and said lowered position.

Accordingly it is an object of the invention to provide a landing gear assembly for heavy military trailers that is operable conveniently and safely by a single operator.

Another object is to provide an assist assembly for the steerable landing gear of a heavy trailer enabling operation by individuals in the 5–95 percentile range.

A further object is to provide a snatch bar for actuating the release handle of a steerable landing gear assembly that maintains a unlatched condition while providing a secondary assist handle during raising and lowering of the landing leg.

DESCRIPTION OF THE DRAWINGS

The above and other features and advantages of the present invention will become apparent upon reading the following detailed description taken in conjunction with the accompanying drawings in which.

DETAILED DESCRIPTION OF THE PREFERRED EMBODIMENT

Figure 1:
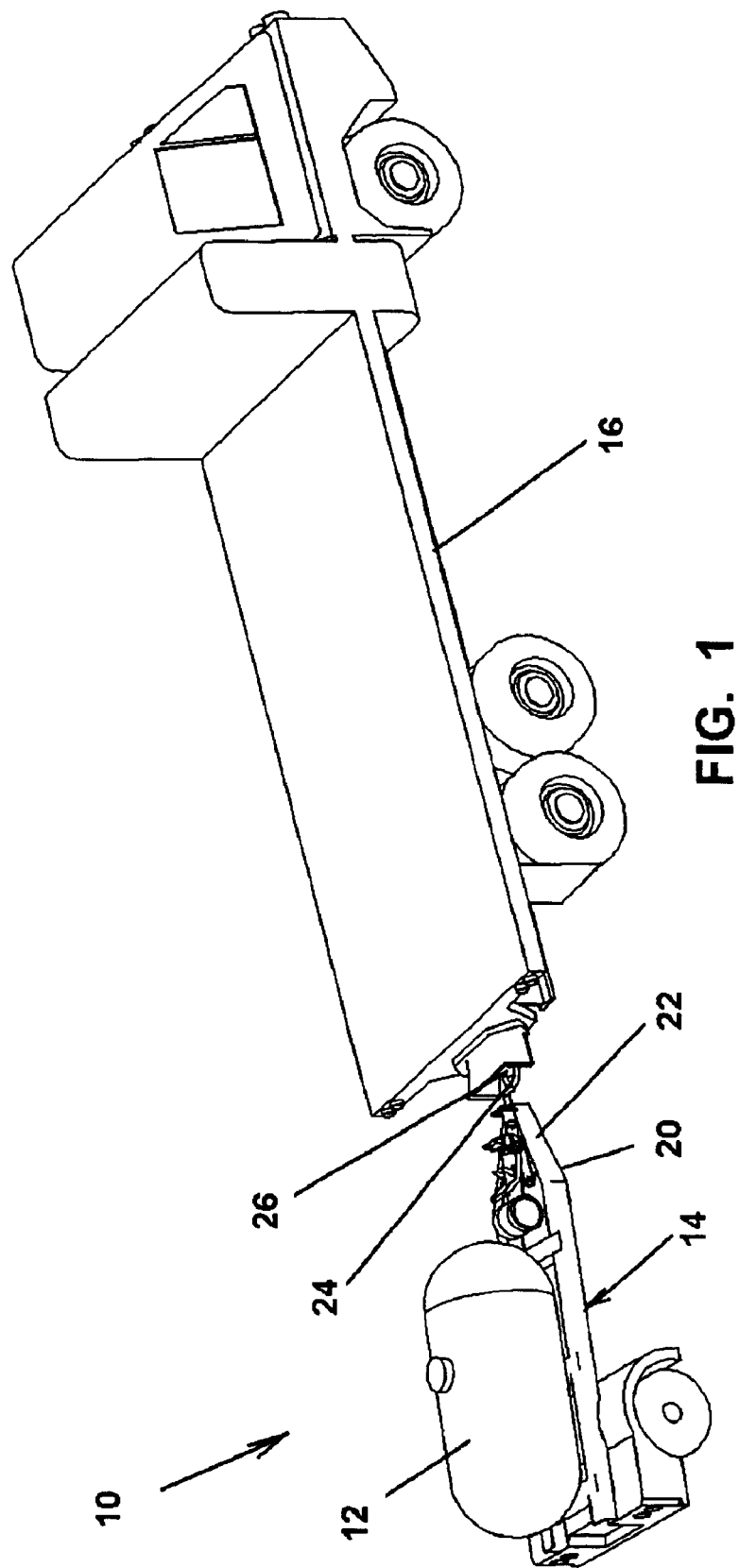
FIG. 1 is a perspective elevational view of a water trailer towed by a transport vehicle and provided with a snatch bar for the release hand of a a steerable landing leg.

Referring to the drawings for the purpose of illustrating a preferred embodiment of the invention and not for limiting same, FIG. 1 shows a water trailer 10 carrying a water supply 12 on a support bed 14 and towed by a transport vehicle 16.

The trailer 10 includes a tongue 20 having converging side beams 22 connected at the rear ends to the trailer chassis 14 and at the front ends to a hitch eyelet 24. The eyelet 24 is releasably connected to a hitch hook 26 on the vehicle 16.

Figure 2:
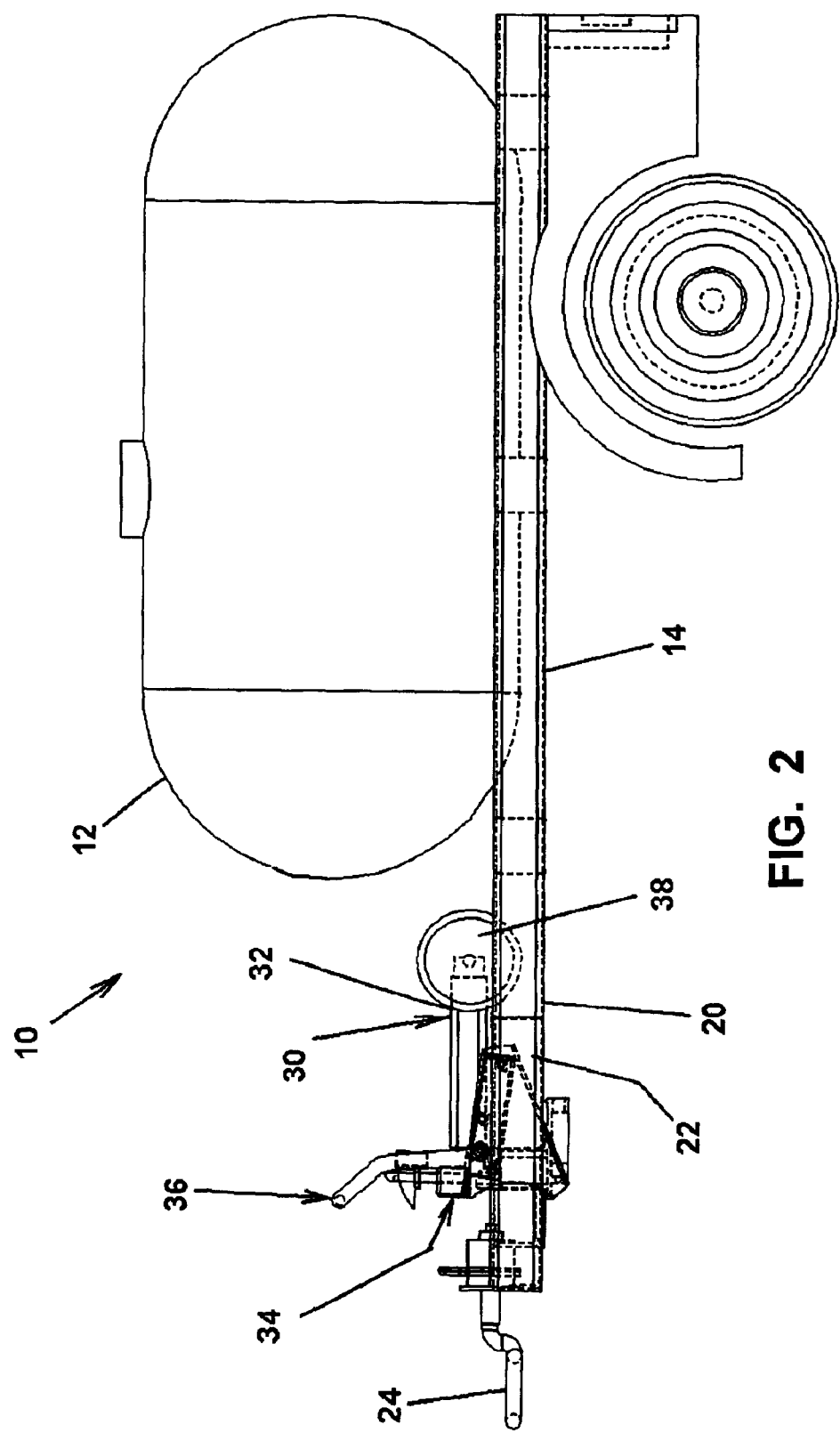
FIG. 2 is a side elevational view of the water trailer with the landing leg in the raised position and the snatch bar in the release position.

As shown in FIG. 2, the tongue 20 on the trailer 10 includes a steerable, wheeled landing gear assembly 30 located longitudinally between the side beams 22. The landing gear assembly 30 has a landing leg 32 that pivots under the control of a latch assembly 34 and a snatch bar assist assembly 36, according to the invention, between a raised position as shown in FIGS. 1 and 2 and a lowered position as shown in FIGS. 3 and 4.

Figure 3:
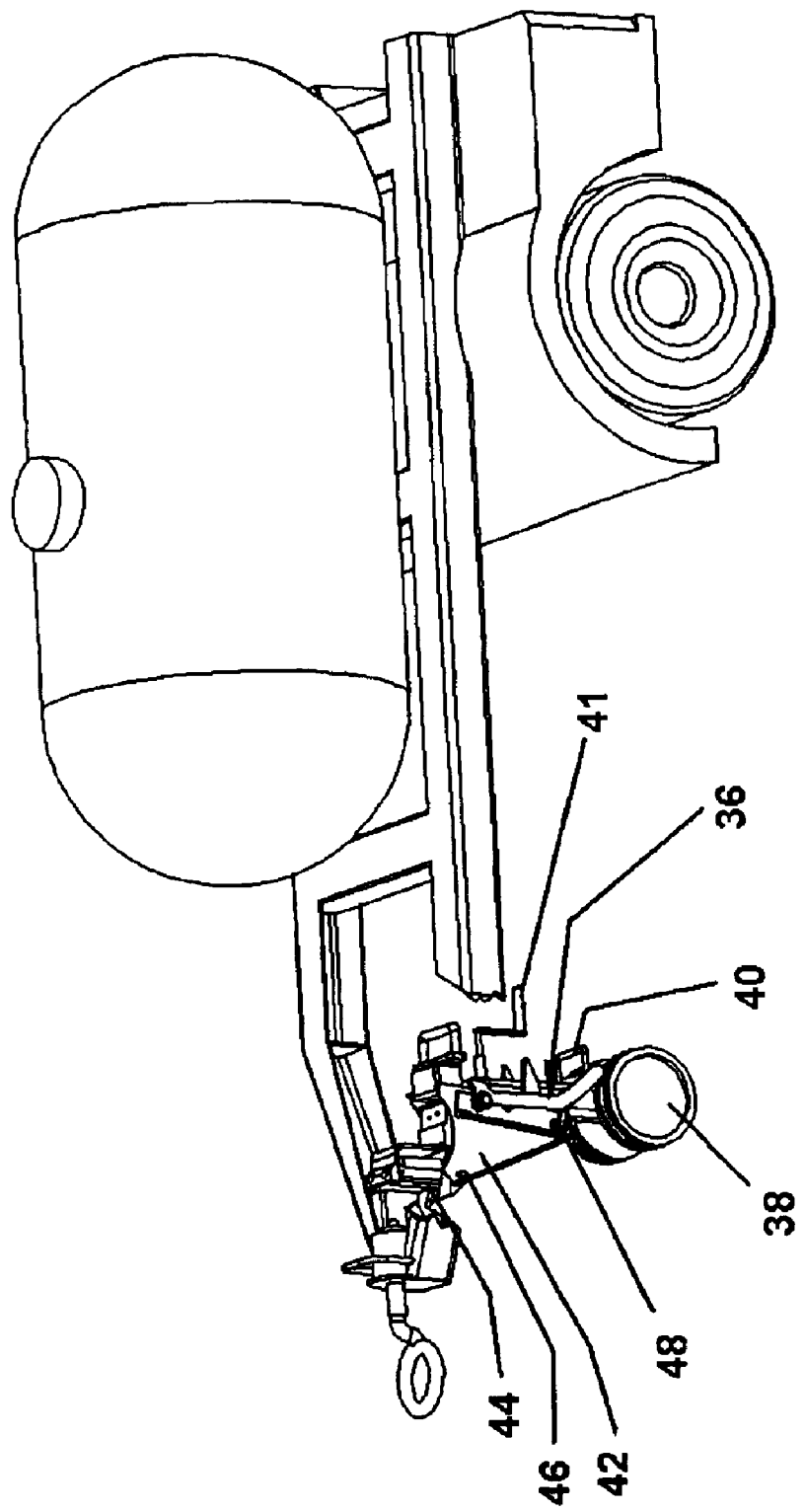
FIG. 3 is a perspective view of the water trailer with the landing leg in the lowered position.
Figure 4:
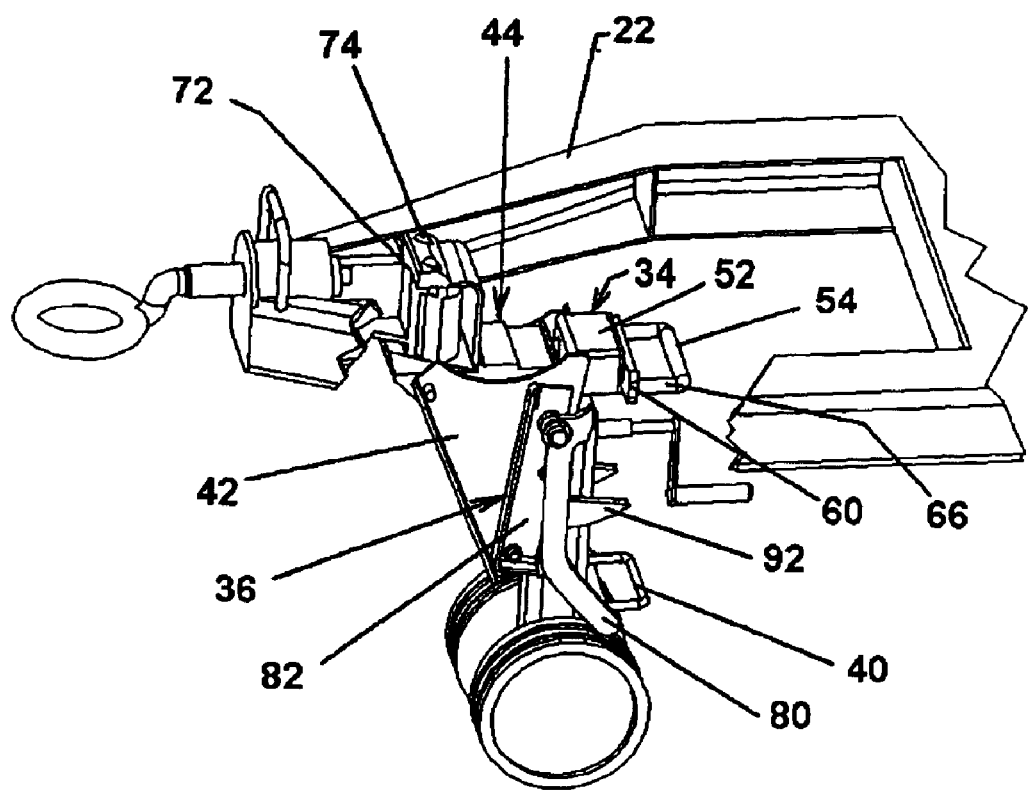
FIG. 4 is a partial perspective view of the landing leg in the lower latched position.

As additionally shown in FIGS. 3 and 4, the landing leg 32 is provided with a pivoting wheel assembly 38 for supporting the trailer on site and accommodating manual movement of the trailer thereabout.

The landing leg 32 is provided with a rearwardly extending lower lift handle 40 at the lower end for assisting in the raising and lowering of the landing leg 32. A jack mechanism operated by handle 41 functions in a conventional manner to vary the effective length of the landing leg for assisting unhitching and leveling of the trailer chassis. The trailer and landing gear assembly as described above are used in connection with M-149 water carriers used by the military. Such landing gear assembly is also use on other military heavy vehicles.

The landing gear assembly 30 is provided with a pair of laterally spaced generally triangular braces 42 that are pivotally mounted at an upper end to a bracket assembly 44 connected to the side beams 22 of the tongue 12 at a horizontal, lateral pin connection 46 and pivotally connected at a lower end to the landing leg 32 at a horizontal, lateral pin connection 48. The braces 40 link the movement of the landing leg 32 between the illustrated raised horizontal position and the lowered vertical position.

The latch assembly 34 selectively locks the landing leg 32 in either the raised position or the lowered position. The latch assembly 36 comprises a generally rectangular latch body 52 slidably supporting a handle 54. The latch body 52 is fixed to the upper end of the leg 32 slightly above the upper pin connection 43.

Figure 5:
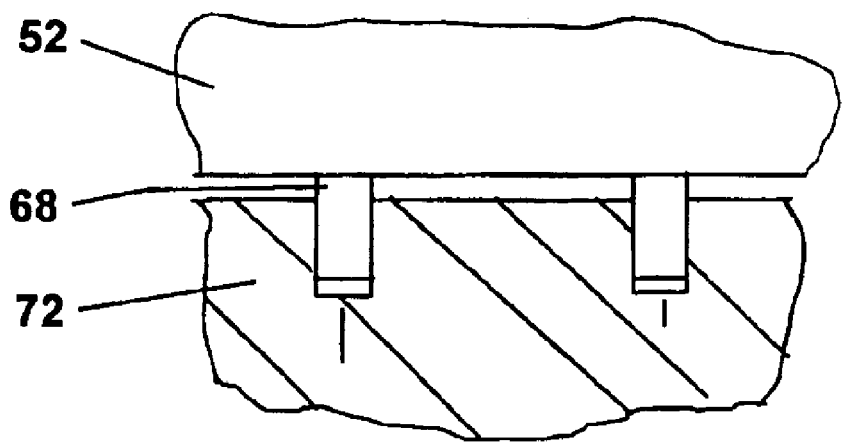
FIG. 5 is a fragmentary cross sectional view showing the release handle in the upper latched condition.
Figure 6:
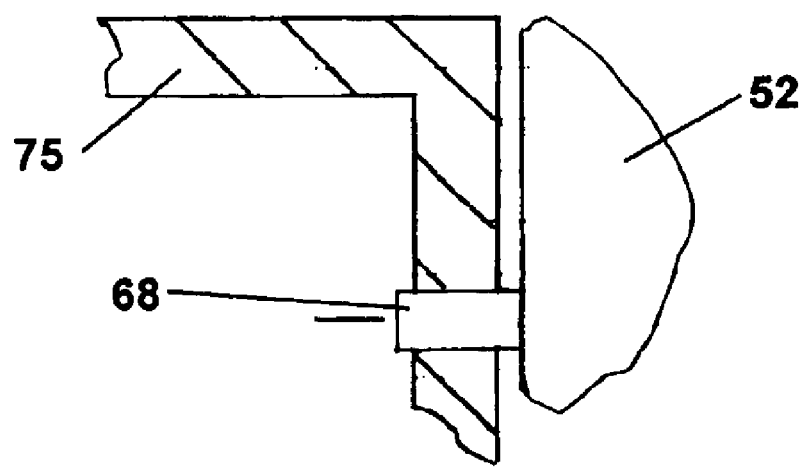
FIG. 6 is a fragmentary cross sectional view showing the release handle in the lower latched condition.
Figure 7:
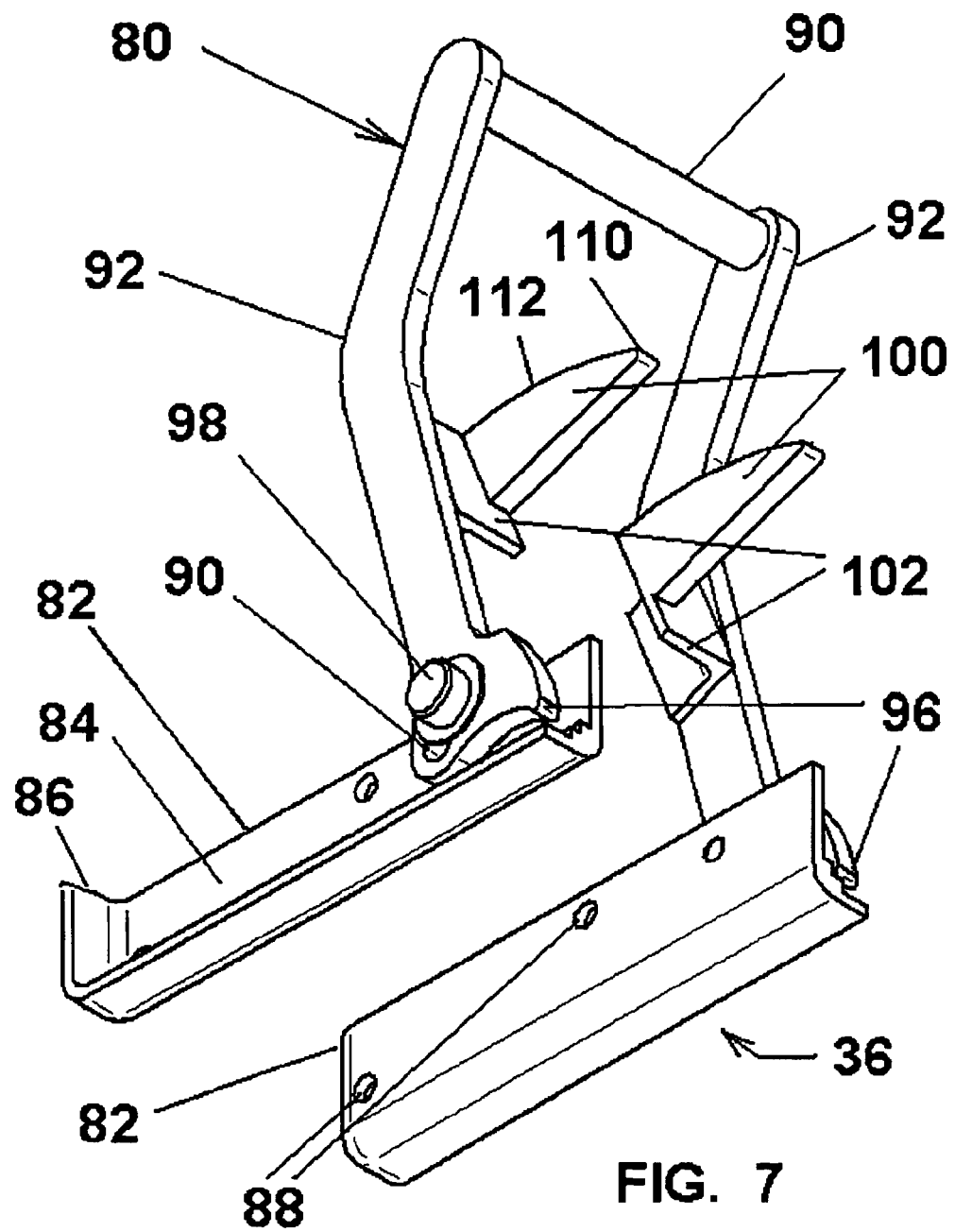
FIG. 7 is a perspective view of the snatch bar assembly prior to mounting on the trailer.
Figure 8:
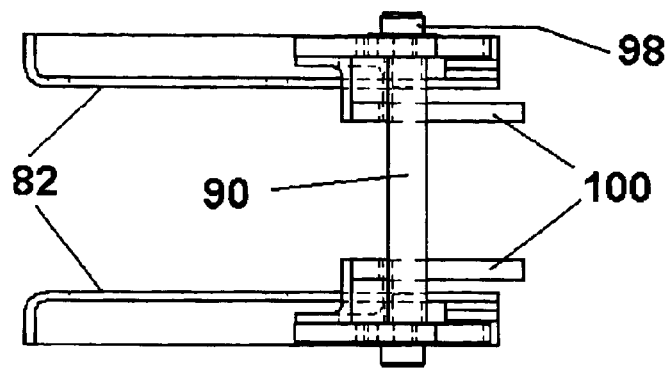
FIG. 8 is a top view of the snatch bar assembly of FIG. 7.
Figure 9:
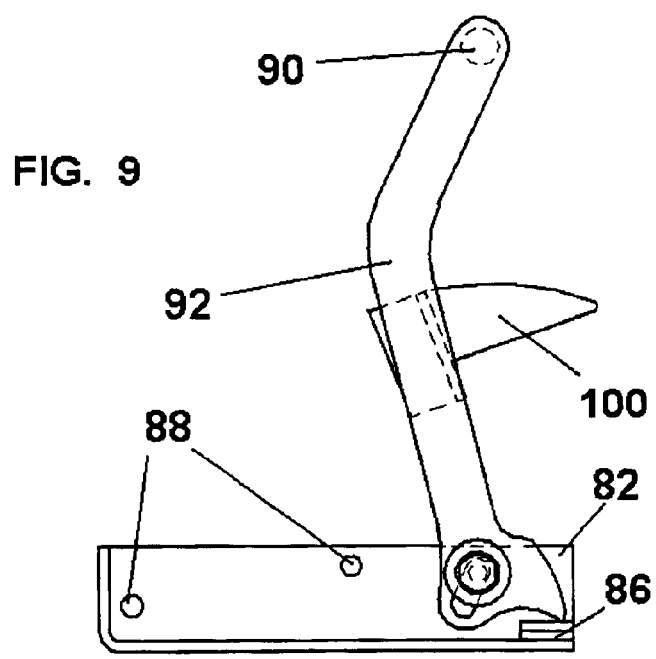
FIG. 9 is a side view of the snatch bar assembly of FIG. 7.
Figure 10:
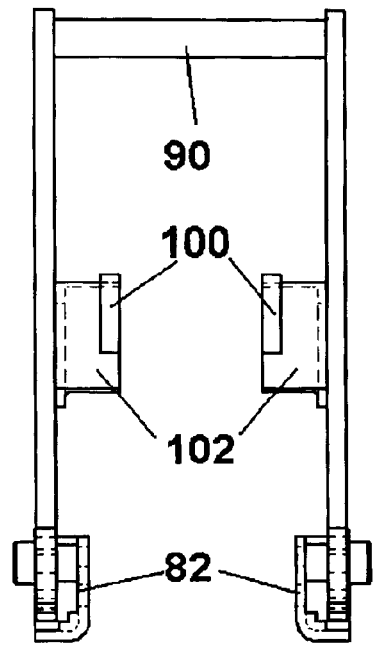
FIG. 10 is a front view of the snatch bar assembly of FIG. 7.

The lift handle 54 includes a U-shaped handle 60 having handle bar 62 with downwardly projecting arms 64 attached to a lateral base 66. As shown in FIGS. 5 and 6, a pair of laterally spaced cylindrical lock pins 68 are attached at upper ends to the base 66 and are slidably received in guide openings in the latch body 52. The lock bolts 68 are normally biased to an extended position by springs, not shown. In the raised position, the latch body 52 overlies an upper lock plate 72 on the bracket 42. The lock plate 72 includes a pair of vertical spaced passages 74 aligned with and into which the lock pins 68 are biased in the raised position to establish a locked condition for the landing gear assembly 30. A lower transverse lock plate 75 includes a pair of horizontal spaced passages 76 aligned with and into which the lock pins 68 are biased in the lowered position to establish a locked condition for the landing assembly 30.

The landing leg 32 may be conventionally manually lowered by an operator by upwardly pulling the handle 54 with one arm to withdraw the lock pins 68 from the upper lock plate 72, simultaneously grabbing the lower handle 34 with the other arm and pivoting to the lower position, and releasing the handle 54 to allow the lock pins to register with the lower passages in the lower lock plate 75. The landing leg is raised by a reversal of the foregoing steps.

The springs biasing the locking bolts have substantial compression requiring considerable force to withdraw. The need to maintain the extended position of the handle while simultaneously lowering the landing leg requires considerable strength and dexterity and effectively eliminates the contribution of one arm. If errors occur and the landing leg falls freely down, there is a risk of personal injury to the operator.

These difficulties are overcome by the snatch bar assembly 36 as shown in FIGS. 7 through 10 which may be furnished as an accessory for either original or existing equipment and does not require modification of the existing landing gear assembly components.

Figure 11:
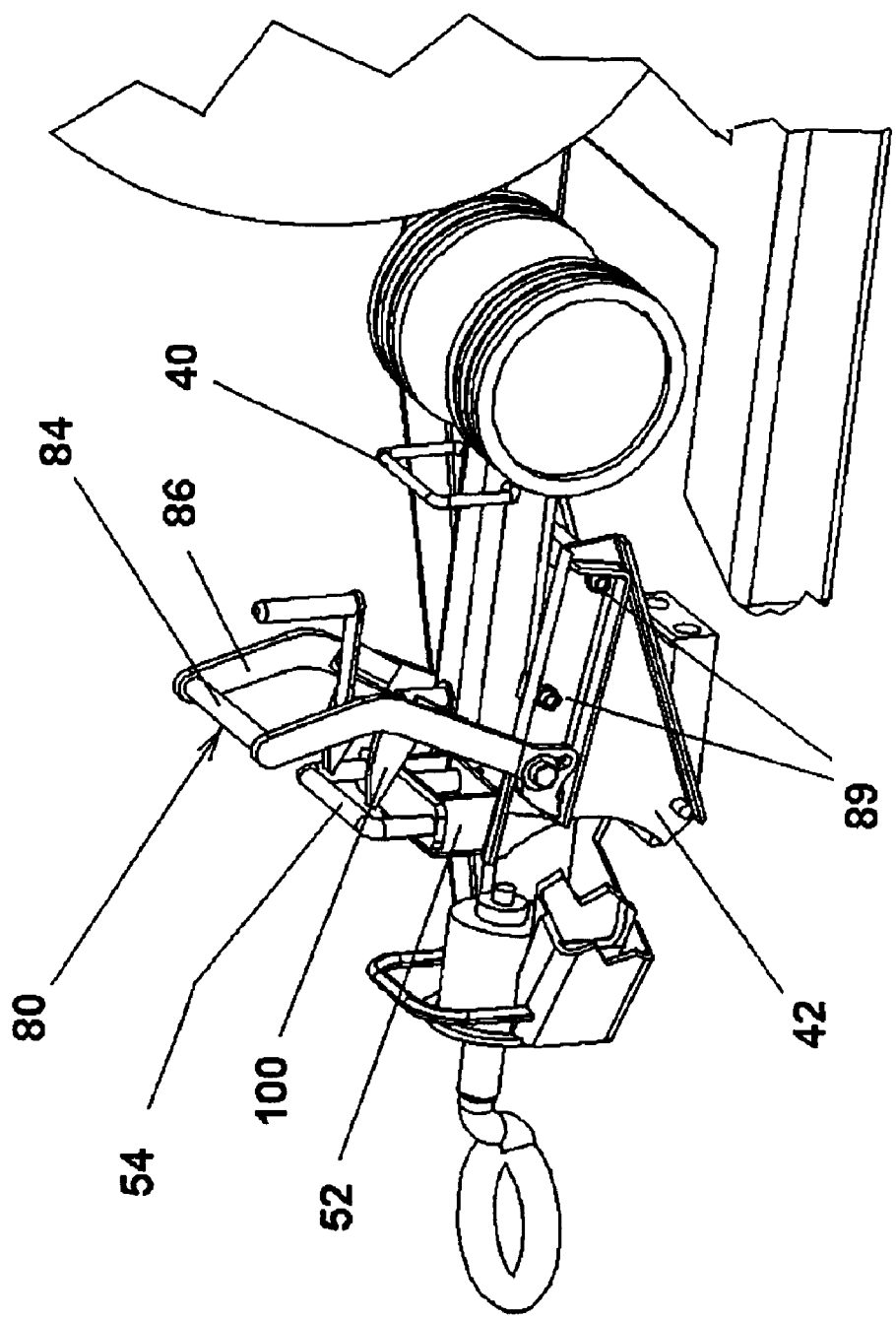
FIG. 11 is a partial perspective view showing the snatch bar prior to engagement of the release handle with the landing leg in the raised position.
Figure 12:
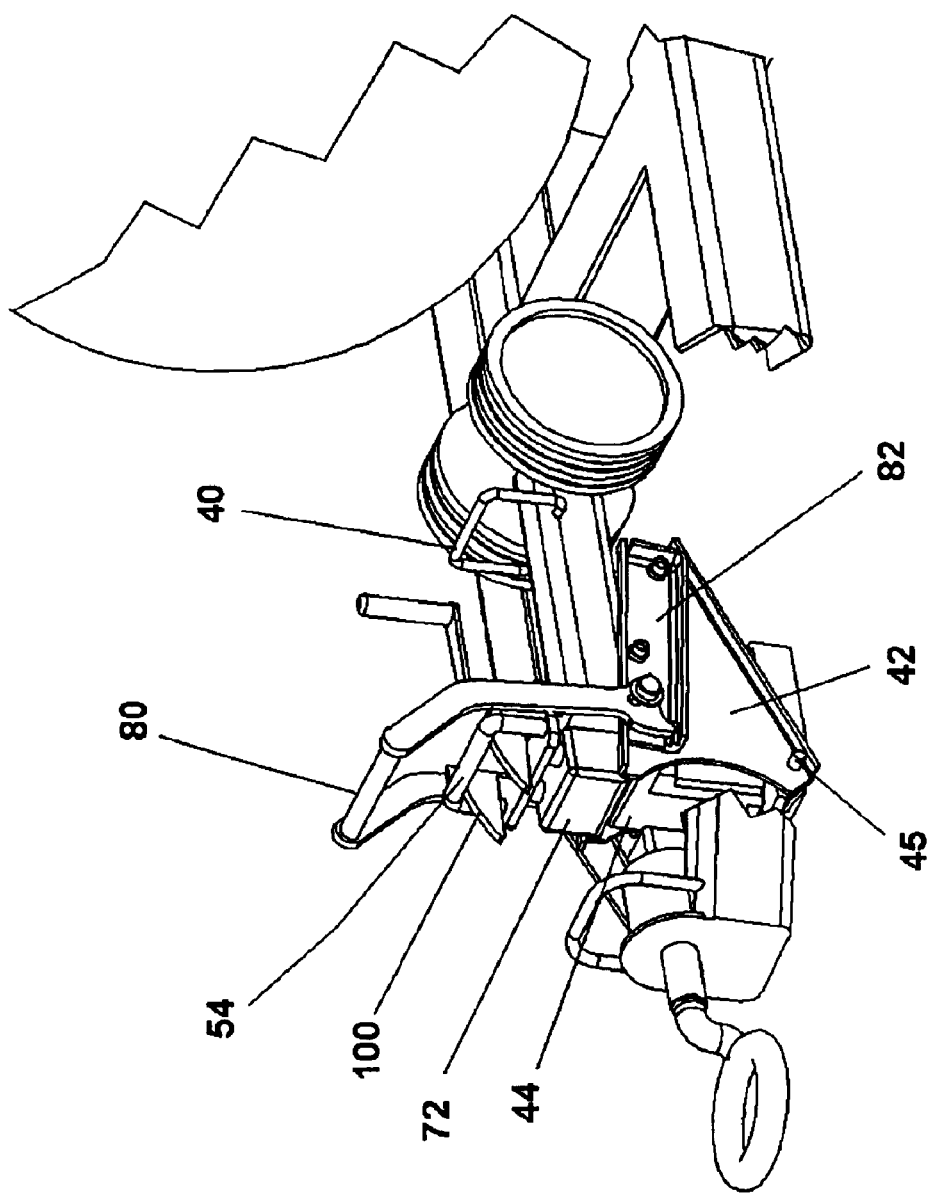
FIG. 12 is a partial perspective view showing the snatch bar prior to engagement of the release handle with the landing leg in the raised position.
Figure 13:
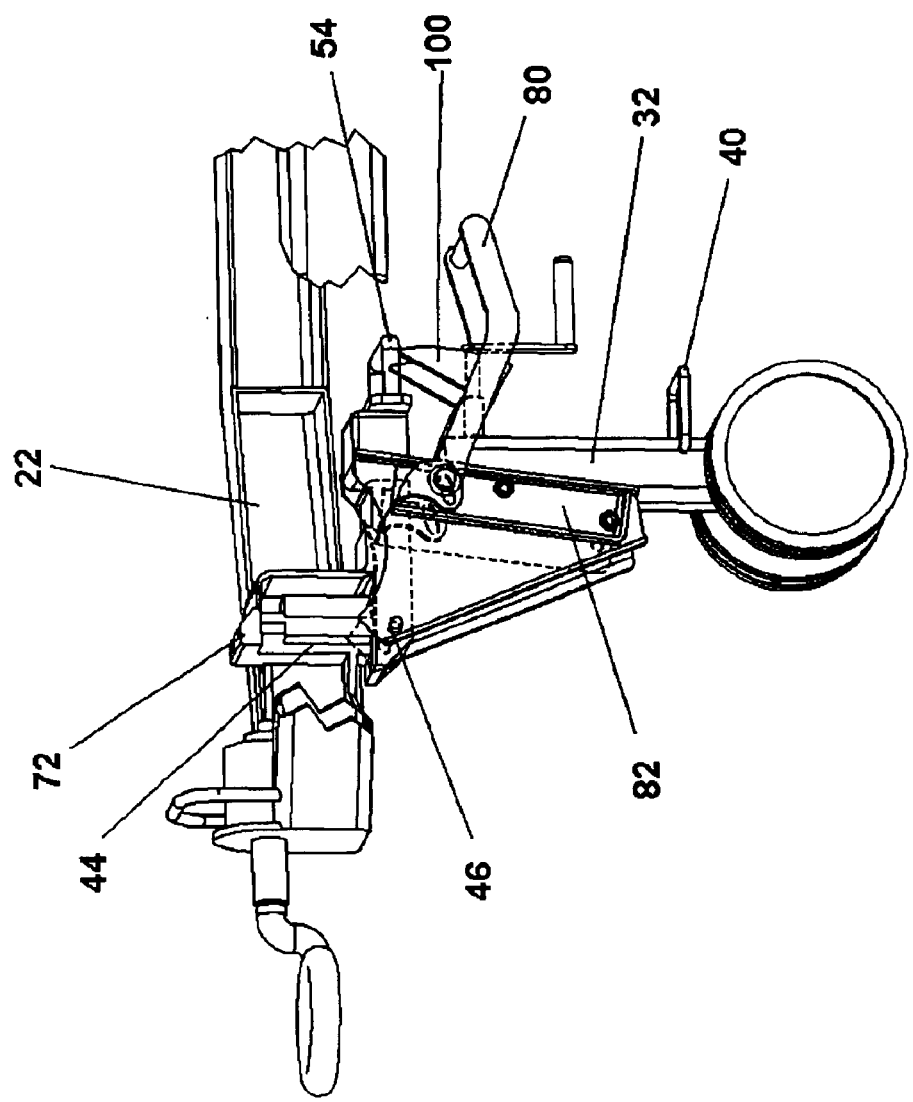
FIG. 13 is a perspective view showing the snatch bar in the unlatched position with the landing leg in the raised position.

The snatch bar assembly 36 includes a generally U-shaped snatch bar 80 that is pivotally carried on laterally spaced adapter brackets 82. The brackets 82 include planar bases 84 surrounded at the bottom and one end by an outwardly turned reinforcing flange 86. The brackets 82 include opening 88 for attachment at existing bolt 89 (FIG. 11) to the sides of the braces 42 on the landing leg 32. The snatch bar 80 includes a transverse handle 90 and a pair of laterally spaced arms 92. The lower ends of the arms 86 include arcuate slots 94 and a pointed pivot foot 96. The arms 92 are pivotally attached to the adapter brackets 82 at the slots by fasteners 98 to establish a transverse pivotal connection. The shanks of the fasteners are carried in the slots 87 and allow initial free movement of the snatch bar 80 in impacting the lift handle as described below.

The handle 90 is located substantially beyond the handle 54. A pair of forwardly projecting cam 100 are attached at the middle of each arm 92 by transverse stop legs 102. The cams 100 have a pointed frontal entry nose 110 having an upwardly inclined camming surface 112. As the snatch bar 80 is pivoted and slammed toward the handle 54, the camming surface 98 engages the bottom surface and upon further movement progressively raises the handle 54 to withdraw the lock pins 68 from the operative lock plate. The snatch bar 80 is further pivoted until the stop legs 102 engage the side arms of the handle. At this position, the latch assembly is in the unlatched condition and the snatch bar is in leverage load transfer relationship with the handle. To controlledly lower the landing leg 32, the operator maintains force on the snatch bar 80 with one hand while grasping the lower handle 40 with the other hand. Accordingly, the operator is able to apply torque, with significant moment arms, at two locations to resist the downward force to the landing leg. First, the torque applied at the snatch bar 80 has a substantial moment arm about bracket pivot connection and pivot foot 96. Second, the torque applied at the lower handle has a substantial moment arm about the upper pivot connection on the landing leg. Further, inasmuch as the operator does not need to worry about maintaining extension of the locking handle, both arms may be dedicated to the controlled and safe lowering of the landing gear. At the lowered position, the snatch bar 80 is reversely pivoted to disengage the cam arms from the locking handle thereby allowing the handle to retract and the lock pins 68 to enter the lower lock plate to maintain the lower latched condition. The snatch bar 80 is reversely impacted to disengage from the handle 54 and lowered to rest against the base leg at a lowered position.

To raise the landing leg 32, the above steps are reversed. After establishing a hitched condition with the transport vehicle in conventional fashion, the snatch bar 80 is raised upwardly and slammed against the latching handle whereupon the cams engage the handle to withdraw the lock pins 68 and unlatch the landing leg 32. With one arm the operator continues to raise the snatch bar handle applying force about the connection 92, and pulls the lower handle 34 with the other hand applying force about the connection 46. When the landing leg reaches the raised position, while maintaining a lifting force on the lower handle 34, the snatch bar 80 is reversely slammed to disengage the cam from the handle and allow the lock bolts to enter the lock plate and establish the raised latched condition. The snatch bar 80 is folded atop the landing leg for storage during transport.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description to be illustrative and are not in any sense limiting of the defined solely in accordance with the following claims.

What is claimed:

1. In a trailer having a landing leg pivotally supported and a trailer tongue and moveable between a horizontal raised position and a vertical lowered position wherein said trailer includes a shiftable release handle moveable between latched condition preventing movement of the landing leg from one of said positions and an unlatched condition permitting movement of the landing leg between positions, an assist device comprising: a lever member pivotally supported on said trailer adjacent said release handle and moveable between a rest position and an actuating position, said lever member including camming surfaces engaging said release handle and effecting movement to said unlatched condition; and stop surfaces maintaining a weight bearing engagement with said release handle for assisting pivoting said landing leg between said raised position and said lowered position.

2. An accessory for operating the release handle of a pivoting landing leg to facilitate pivotal movement between a raised position and lowered position wherein said release handle operates latching means for establishing a locked condition at said raised position and said lowered position, said accessory comprising: a pair of adapter brackets fixed to the sides of said landing leg, a generally U-shaped handle member having side arms pivotally connected to said adapter brackets and providing for rotation of said handle member toward said release handle; cam members carried on said side arms of said handle member engaging and shifting said release handle to establish an unlatched condition of said latching means; and stop means on said handle member engaging said release handle when said unlatched condition is established allowing said handle member to be grasped by an operator for assisting movement between said positions while maintaining said unlatched conditions.

3. The accessory as recited in claim 2 wherein said cam members project from said arms and having a curved camming surface for progressively raising said latching means to said unlatched condition.

4. The accessory as recited in claim 3 wherein said adapter brackets include bolt holes adapted for attachment to existing fasteners on said landing leg.

5. The accessory as recited in claim 4 wherein said cam members are spaced inwardly from said side arms by stop members which engage the release handle to establish a load bearing relation at said unlatched condition.

* * * * *